Nov. 1, 1966  M. P. NEAL ET AL  3,282,394
BOTTLE ORIENTING MACHINE
Filed Aug. 30, 1963  11 Sheets-Sheet 1

INVENTORS
MORRIS P. NEAL
JAMES L. NEAL
DONALD G. REICHERT
SYLVAN V. DICE
BY Newton, Hopkins & Jones
ATTORNEYS Nov. 1, 1966 M. P. NEAL ET AL 3,282,394

BOTTLE ORIENTING MACHINE

Filed Aug. 30, 1963 11 Sheets-Sheet 4

INVENTORS
MORRIS P. NEAL
JAMES L. NEAL
DONALD G. REICHERT
SYLVAN V. DICE
BY Newton, Hopkins & Jones
ATTORNEYS

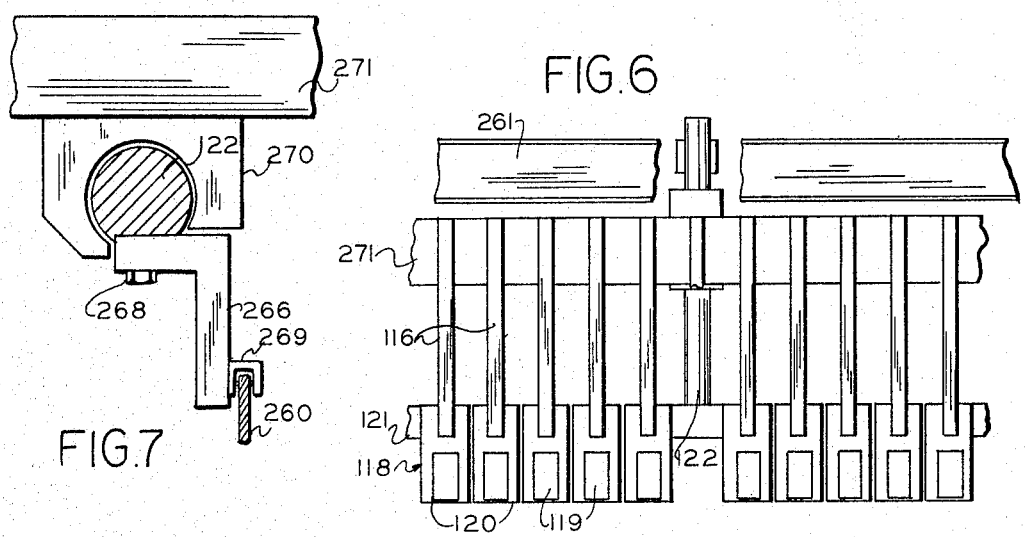
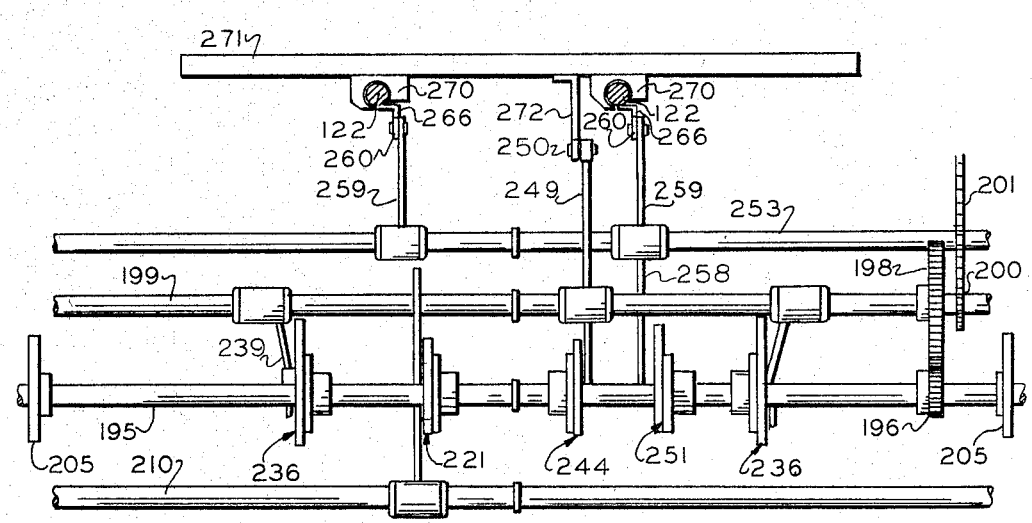

Nov. 1, 1966  M. P. NEAL ET AL  3,282,394

BOTTLE ORIENTING MACHINE

Filed Aug. 30, 1963  11 Sheets-Sheet 6

INVENTORS
MORRIS P. NEAL
JAMES L. NEAL
DONALD G. REICHERT
SYLVAN V. DICE
BY
Newton, Hopkins & Jones
ATTORNEYS

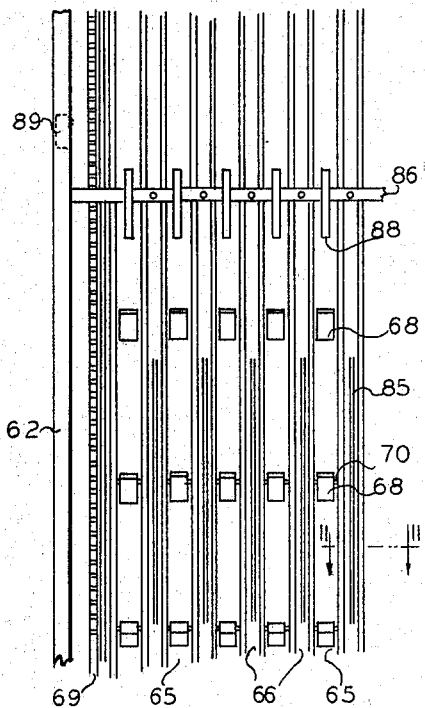
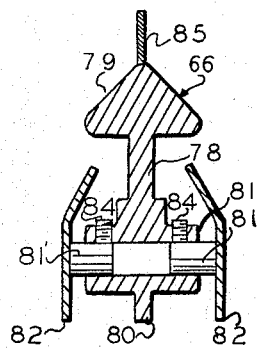
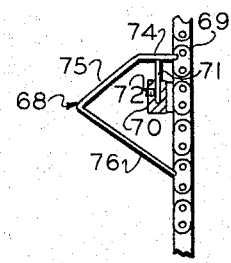
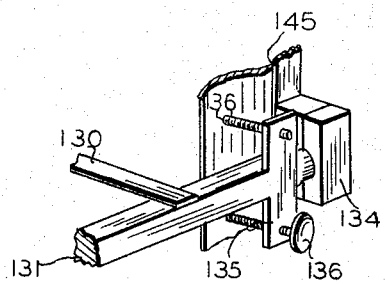

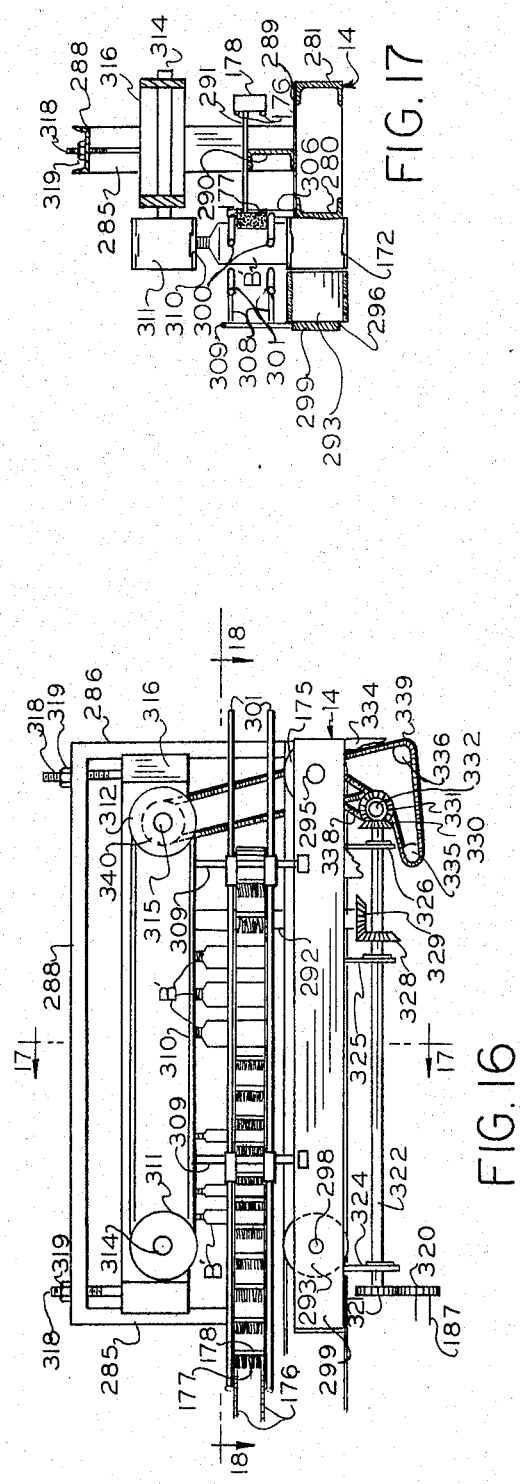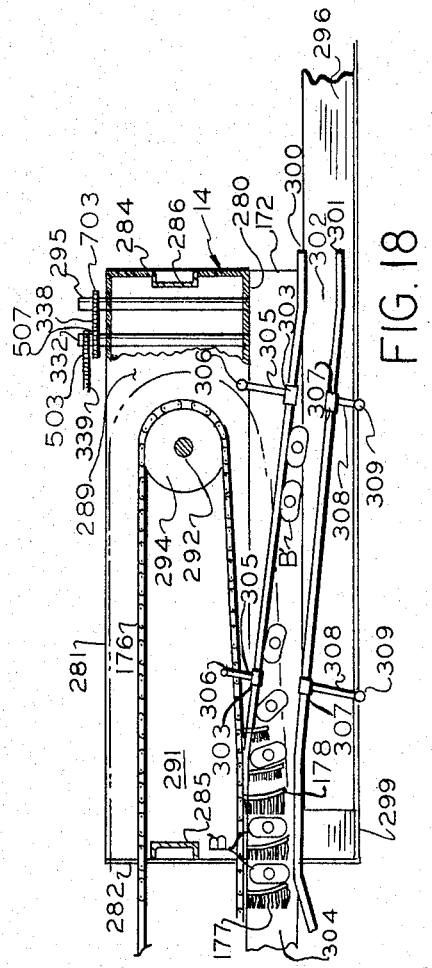

United States Patent Office 3,282,394
Patented Nov. 1, 1966

3,282,394
BOTTLE ORIENTING MACHINE
Morris P. Neal and James L. Neal, Clearwater, and Donald G. Reichert and Sylvan V. Dice, Tarpon Springs, Fla., assignors to A-B-C Packaging Machine Corporation, Largo, Fla., a corporation of Illinois
Filed Aug. 30, 1963, Ser. No. 308,923
7 Claims. (Cl. 198—33)

This invention relates to orienting devices, and is more particularly concerned with a bottle orienting machine for orienting lightweight bottles of plastic or the like.

In the bottling industry, numerous machines have been devised to orient bottles and put them in single order to be passed through filling machinery. However, with the advent of plastic bottles of polyethylene and similar materials, new problems have been presented. This is because bottles of plastic or similar material are too light in weight to activate the usual switches and to be handled by the usual mechanical devices of previous machines. This has led to much hand labor in setting up bottles in the order required. Hand labor is undesirable because it is slow and expensive.

Plastic bottles are inherently difficult to handle mechanically primarily because of their relatively light weight. The bottles must be held when moving between positions in the machine and even when falling or sliding in the machine, the bottles must be carefully guided or they will stray from their intended path. This problem is especially acute when the bottles are being initially oriented in a machine since the bottles are customarily dumped from a case into the machine and must be aligned in a single line with all bottles upright. Moreover, with oval shaped bottles, the bottles must be aligned with their longer dimension in the same direction.

The machine of the present invention solves the above stated problems by providing a hopper into which bottles are placed. An input conveyor extends into the hopper and carries the bottles out of the hopper in lanes. The device has means outside the hopper to assure that the bottles on the input conveyor are in the lanes with only one bottle in any one space. The input conveyor carries the bottles into means for placing all bottles in an upright position. The bottles are held in position, or guided in falling or sliding, until they are placed on an outfeed conveyor. Aligning means is located to receive bottles from the outfeed conveyor and position all oval shaped bottles with their longer dimension turned in the same direction.

These and other features and advantages of the present invention will become apparent from consideration of the following detailed description when taken in conjunction with the accompanying drawings in which:

FIG. 6 is a cross-sectional view of the bottle righting mechanism taken substantially along the line 6—6 in FIG. 3.

FIG. 7 is an enlarged view showing the manner in which the kickers are supported by the rods which move the ledges.

FIG. 8 is a rear elevational view of the cams, cam followers and cam follower arms used for control of the bottle righting mechanism.

FIG. 10 is a partial top plan view of the input conveyor used in the device of the present invention.

FIG. 11 is an enlarged section view of a guide of the input conveyor taken substantially in the line 11—11 in FIG. 10.

FIG. 12 is a side view of one of the lugs of the input conveyor, and showing the mounting means.

FIG. 13 is a perspective view of the means for adjusting the position of the stops of the bottle righting mechanism.

FIG. 16 is a side elevational view of the dimension aligning mechanism for aligning the long dimensions of oval shaped bottles.

FIG. 17 is a section view of the dimension aligning mechanism taken in the line 17—17 in FIG. 16.

FIG. 18 is a section view of the dimension aligning mechanism taken in the line 18—18 in FIG. 16.

Referring now more particularly to the drawings and to that embodiment here chosen by way of illustration, the machine comprises a hopper 10 into which the bottles are fed by a dribble feeder of known type (not shown). Any conventional dribbler feeder can be used which provides a constant supply of bottles. An input conveyor 11 begins within the hopper 10 and extends into a bottle righting mechanism 12 in which the bottles are placed in an upright position. The bottles are carried out of the bottle righting mechanism 12 to a dimension aligning mechanism 14 in which oval shaped bottles are aligned with their longer dimensions all extending in the same direction.

HOPPER

Figure 1:
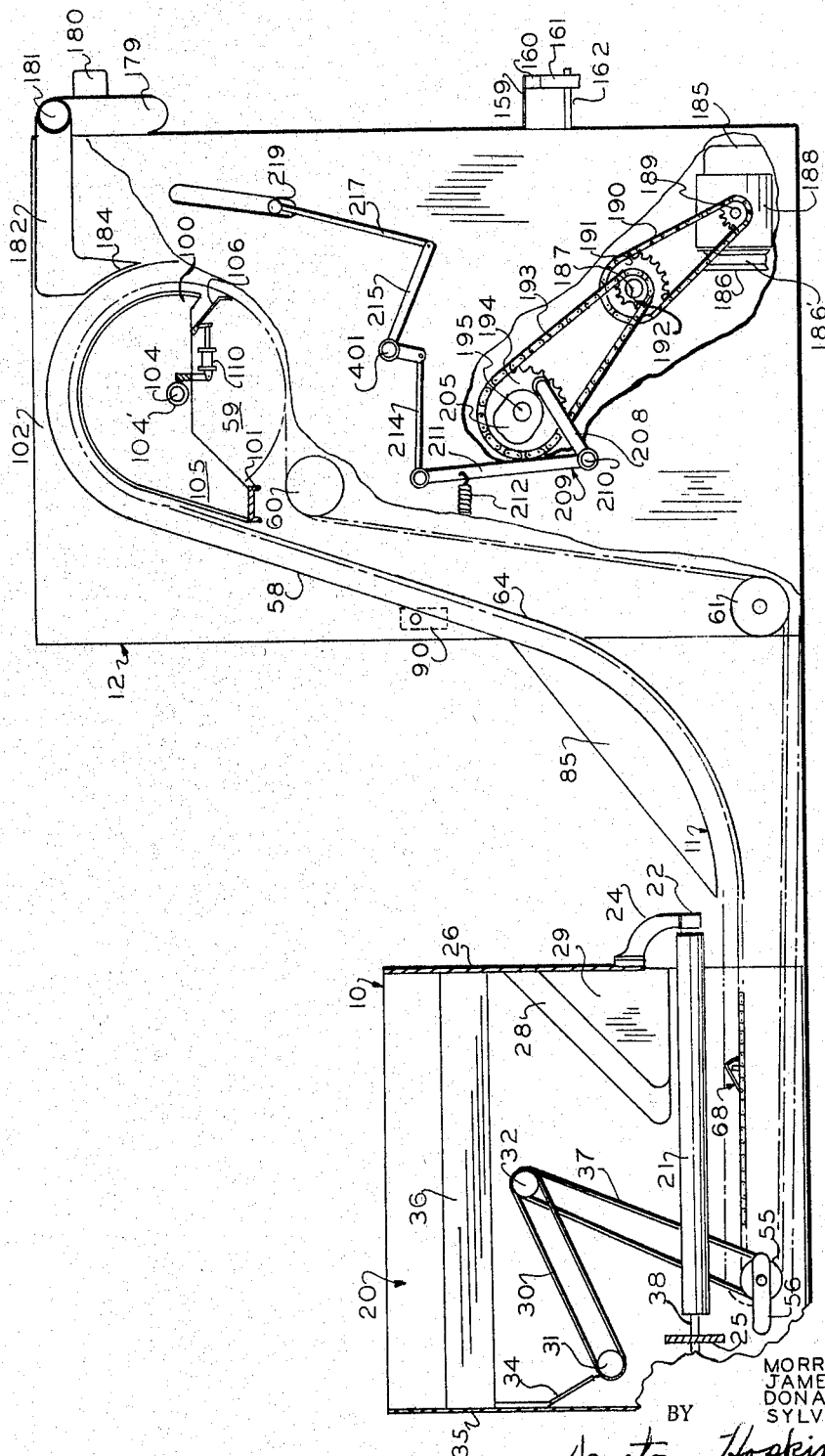
FIG. 1 is a side elevational view, partially cut away and partially in cross-section, of one preferred embodiment of the present invention.
Figure 4:
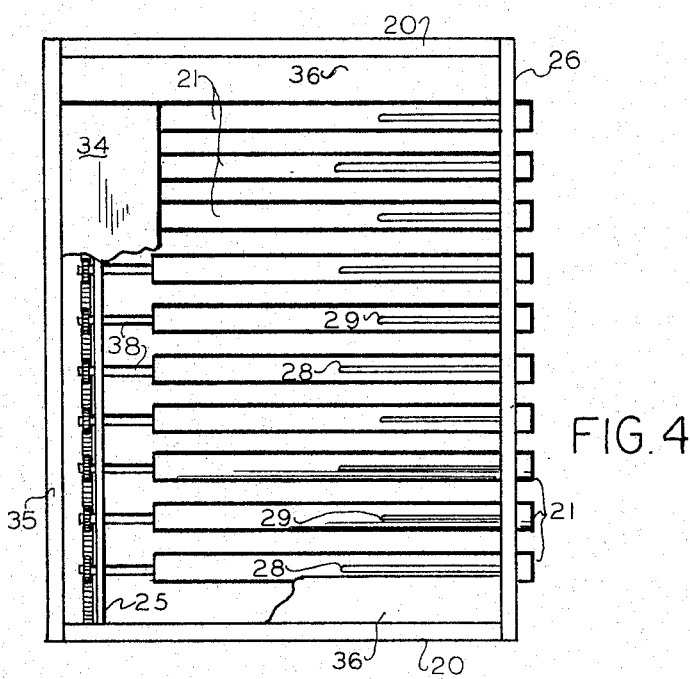
FIG. 4 is a top plan view of the hopper, with portions of the guides being cut away and with the dribble belt removed.
Figure 5:
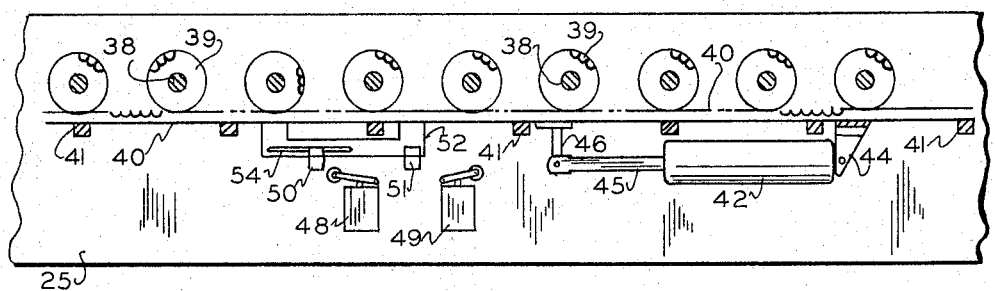
FIG. 5 is a detail view showing the drive means for the rollers in the hopper.
Figure 9:
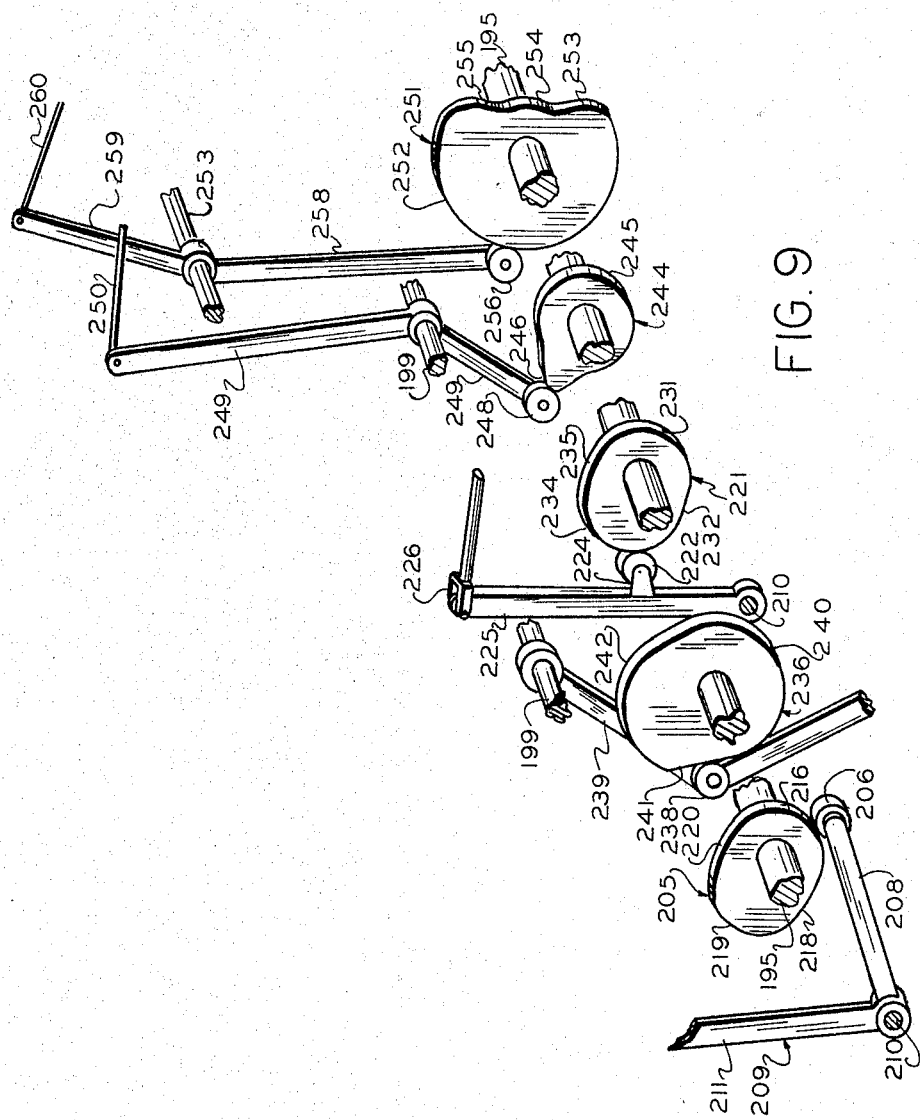
FIG. 9 is an exploded, perspective view of the cams, cam followers, and cam follower arms of FIGURE 8.

The hopper 10 is best seen in FIGS. 1, 4 and 5 of the drawings, and includes a rectangular housing having a plurality of rollers 21 mounted longitudinally in the housing. The rollers 21 are parallel and equally spaced. Each roller 21 is mounted for rotational oscillation on a shaft 38 having one end in a rear bearing 22 carried by a bracket 24. There is a plurality of brackets 24, each bracket 24 holding one bearing 22 and mounting one roller 21. The brackets 24 are secured to the rear wall 26 of the housing by welding or other known means as shown in FIG. 1.

The opposite ends of the shafts 38 extend through bearings (not shown) supported by a transverse member 25. The drive for the rollers 21 is mounted between the transverse member 25 and the front wall 35 of the hopper housing, and will be described hereinafter.

On the rear wall 26 of the housing is a baffle 28 or 29 over and aligned with each roller 21. The baffles 28 and 29 are substantially triangular plates which are supported by the rear wall 26. Every alternate roller 21 has a baffle 28 thereover, and the other rollers 21 have a baffle 29 thereover. The only difference in the baffles 28 and the baffles 29 is that the baffles 28 are larger.

The purpose of the baffles 28 and 29 is to prevent incoming bottles from becoming lodged within the hopper. The large baffles 28 alternated with the small baffles 29 give an irregular configuration which will cause the incoming bottles to tumble as they contact the rollers 21. The baffles 28 and 29 also force the incoming bottles toward the front wall 35 of the hopper 10 so that the rollers 21 can place the bottles in a lane of the input conveyor 11, as will be discussed later.

FIG. 1 shows a dribble belt 30 within the housing. The dribble belt 30 allows an accumulation of bottles within the hopper 10 while providing a dribble feed to the rollers 21 and the input conveyor 11. Transverse rollers 31 and 32 are journalled in the side walls 20 of the housing, and carry the belt 30. The rear roller 32 is higher than the forward roller 31, giving the belt 30 an upward slant in the direction of feed.

A guide plate 34 is attached to the front wall 35 of the housing to prevent bottles from falling into the drive mechanism for the rollers 21. The guide plate 34 and the belt 30 provide a pocket in which bottles can accumulate and from which the bottles are fed by the movement of the belt 30.

The belt 30 is driven from the input conveyor 11 by a drive chain 37 as shown in FIG. 1. It will be understood that the chain 37 is at one end of the roller 32 and is on a sprocket wheel (not shown) which rotates with an idler sprocket wheel 55 of the input conveyor 11. Since the dribble belt 30 is driven from the input conveyor 11, the motion of the belt 30 is timed so that the input conveyor 11 will not be over-fed.

As shown in FIG. 4, side guides 36 are provided. Similar to the guide plate 34, the side guides 36 insure that the bottles will fall to the rollers 21 and not to the side of the input conveyor 11.

Referring now to FIG. 5 of the drawings it will be seen that the rollers 21 are driven through a rack and pinion arrangement activated by an air cylinder. Pinion gears 39 are fixed to the forward ends of the shaft 38 which carry the rollers 21. All of the pinion gears 39 are engaged by a rack gear 40 so that, when the rack 40 is moved in an oscillatory manner all of the pinion gears 39 rotate in an oscillatory manner.

The rack 40 is slidably held against the pinion gears 39 by a plurality of bearing blocks 41. The blocks 41 are fixedly mounted on the transverse member 25 and may be made of bronze or the like to give a good bearing surface. However, the relatively little motion between the rack 40 and the blocks 41 will not cause undue wear of either the blocks 41 or the rack 40.

An air cylinder 42 is mounted on a strut 44 attached to the transverse member 25 and the piston rod 45 of the air cylinder 42 is connected to the rack 40 by a finger 46. As the piston rod 45 is projected and retracted, the rack 40 will be reciprocated. To control the air cylinder 42, there are two microswitches 48 and 49 positioned on the transverse member 25 to be engaged by lugs 50 and 51 respectively. The lugs 50 and 51 are mounted on a plate 52 which is rigidly attached to the rack 40. The lug 50 is mounted in a slot 54 so that its position along the length of the rack 40 can be varied.

The operation of the air cylinder 42 is conventional. When the lug 50 contacts the switch 48, air enters the front of the air cylinder 42 to retract the piston rod 45 and move the rack 40 to the right, as viewed in FIG. 5. In the extreme right position of the rack 40, the lug 51 will contact the switch 49 and cause a valve (not shown) to shift and direct air into the rear of the air cylinder 42, causing the piston rod 45 to project and move the rack 40 to the left. As the rack 40 moves to the left, the lug 50 will once again contact the switch 48, and the cycle is repeated. The stroke of the air cylinder 42 and the travel of the rack 40 is varied by moving the lug 50 so that it will contact the switch 48 at various points in the motion of the rack 40 to the left as viewed in FIG. 5.

From the foregoing description, it will be seen that the feeder hopper causes a random distribution of bottles as the bottles strike the baffles 28 and 29 and the bottles are prevented from sticking within the hopper by the oscillating rollers 21. If bottles land on the rollers 21, the oscillatory rotational motion of the rollers 21 will shake them off so that they fall between the rollers 21 to the input conveyor 11.

The rollers 21 insure that the bottles fall into the lanes 65 of the input conveyor 11 and are necessary for oval shaped bottles since oval shaped bottles falling between or across the lanes 65 of the input conveyor 11 do not tend to drop into the lanes 65. The oscillatory rotation of the rollers 21 prevents oval shaped bottles from resting in similar fashion on the rollers 21 and the bottles drop directly into the lanes 65 from between rollers 21.

However, bottles circular in cross-section have little tendency to position themselves between the lanes 65 of the input conveyor 11 and it has been found that the rollers 21 are not required if only round bottles are to be fed to the machine.

The dribble belt 30 is used to insure a dribble feed to the input conveyor. However, in some applications, the external dribble feeder (not shown) can be used as the sole means for obtaining dribble feed so as to obviate the need for the belt 30.

INPUT CONVEYOR

The input conveyor 11 has one end below the rollers 21 inside the hopper 10 and extends to the bottle righting mechanism, generally indicated at 12. The input conveyor 11 comprises a plurality of lugs 68 carried between two chains 69. Each chain 69 extends from an idler sprocket wheel 55 rotatably positioned adjacent to a side 20 of the hopper 10 to a large sprocket wheel 59 rotatably positioned in the bottle righting mechanism 12, thence over and under the large sprocket wheel 59 to an idler sprocket wheel 60 rotatably positioned in the bottle righting mechanism 12 below the large sprocket wheel 59, thence over the idler sprocket wheel 60 and downward to an idler sprocket wheel 61, and thence back to the idler sprocket wheel 55.

Each idler sprocket wheel 55 has a tensioning means 56 of known type to maintain tension in the chain 69 passing over it and the arrangement of the chains 69 results in the chains 69 and the lugs 68 continuously moving from beneath the rollers 21 in the hopper 10 to the large sprocket wheels 59 and the bottle righting mechanism 12 when the large sprocket wheels 59 are rotated in a clockwise manner as viewed in FIG. 1.

A plate 64 extends beneath the lugs 68 from adjacent to the idler sprocket wheels 55 within the hopper 10 to a hood 100 positioned between the large sprocket wheels 59. The hood 100 will be described later. Side rails 62 extend upward from the edges of the plate 64 and with the plate 64 form a channel within which the chains 69 and the lugs 68 positioned between the chains 69 move as they travel from beneath the rollers 21 to the hood 100.

The chains 69 are adjacent to the side rails 62 as the chains 69 move from the idler sprocket wheels 55 to the large sprocket wheels 59 and dividers 66 divide the space above and between the chains 69 within the channel formed by the plate 64 and the side rails 62 into a plurality of lanes 65. It is within these lanes 65 that the plurality of lugs 68 move. The lugs 68 are carried on a plurality of lug bars 70 extending between and equally spaced along the chains 69. Each of the lug bars 70 carries one row of lugs 68 with a lug 68 being positioned in each lane 65.

The construction of each lug 68 and of the lug bar 70 is best seen in FIG. 12. Each lug bar 70 has holes therein which receive a mounting pin 71 on each lug 68 carried by the lug bar 70. The pin 71 is held in place by a set screw 72. The leading portion 74 of each lug 68 is flat and perpendicular to the plane of the chains 69. The portion 75 adjoining the portion 74 is inclined upward and backward and the rearmost portion 76 of each lug 68 extends downwardly to the plane of the chains 69. With this construction of the lugs 68, a bottle above the plate 64 will rest on the portion 74. However, if the bottle above the plate 64 engages only the adjoining portion 75, it will fall backward along the plate 64 as will be seen later. The rear portion 76 closes the lug 68 to prevent bottles from becoming stuck under a portion of the lug 68.

The dividers 66 are positioned above the plate 64 and between the side rails 62 and the construction of the dividers 66 is best shown in FIG. 11. A central rib 78 has a cap portion 79 extending throughout its length. The lowermost end 80 of the rib 78 serves as a bearing surface to hold the lug bars downward toward the plate 64 so as to hold the chains 69 and lug bars 70 within the channel formed by the plate 64 and side rails 62. Bosses 81 project transversely from the rib 78. The bosses 81 have holes therein which receive pins 81' extending from the guide rails 82. Set screws 84 adjustably fix the position of the pins 81' and since the lanes 65 are between the guide rails 82 of adjacent dividers 66, the width of the lanes 65 is adjustable.

Walls 85 are integral with and extend above the cap portions 79 of the dividers 66 where the dividers 66 extend upward adjacent to the hopper 10. Above the walls 85 along the lengths of the dividers 66 is a bar 86 extending between side rails 62 transversely of the input conveyor 11. The bar 86 mounts a plurality of leaf springs 88 with one spring 88 being over each lane 65 and projecting downward into the lane 65. Above the bar 86, there is a photoelectric cell 89 secured to one side rail 62 and a complementary light source 90 secured to the other side rail 62 so that the beam of light is across the plate 64 just above the lugs 68.

It will now be understood that bottles will fall between the rollers 21 in the hopper 10, and will be deposited on that end of the input conveyor 11 within the hopper 10 in the lanes 65. As the bottles leave the hopper 10 moving with the lugs 68 along the plate 64 toward the bottle righting mechanism 12, the bottles are piled at random in each of the several lanes 65 of the input conveyor 11. However, the walls 85 prevent the bottles from falling across the dividers 66 from one lane 65 to another.

After leaving the hopper 10, the input conveyor 11 carries the bottles up the upwardly inclined portion 58. This allows the force of gravity to rid the upper portions of the lanes 65 of any bottles not firmly held on the input conveyor 11. This is because the portion 74 of a lug 68 will hold only one bottle and additional bottles tend to fall from the area of the lug 68 to the area having the walls 85.

The leaf springs 88 act as rakes. If a bottle remains on the same lug 68 with another bottle in spite of the shape of the lug 68 and gravity, the leaf spring 88 extending downward into the lane 65 in which the lug 68 is moving rakes off the top bottle, leaving only a single bottle on the single lug 68. As a safety feature, if the leaf springs 88 fail to remove an excess bottle, the bottle interrupts the light from the light source 90 to the photoelectric cell 89 causing circuitry of known type to stop the movement of the input conveyor 11.

To insure that only one bottle is carried by each lug 68, the lanes 65 must be only wide enough to accommodate one bottle. The widths of the lanes 65 are adjustable as suggested above by loosening the set screws 84 and moving the guide rails 82 the proper distance. When the distance between the guide rails 82 is set, the set screws 84 are tightened to maintain the setting and lane 65 width.

The cap portions 79 of the dividers 66 are shown as having downwardly tapering sides. This configuration of the cap portions 79 prevents bottles from resting on the dividers 66. However further up the inclined portion 58 of the input conveyor 11, the cap portion 79 may be flat, since no bottles can rest thereon because of the slope of the input conveyor 11.

The input conveyor 11 is driven by a chain 201 which joints a sprocket 202 on the shaft 104 and a sprocket 200 on a shaft 199 in the bottle righting mechanism 12. The shaft 199 is rotated in a manner to be described when the bottle righting mechanism 12 is described below and the resulting rotation of the shaft 104 rotates the large sprocket wheels 59 mounted on the shaft 104. The rotation of the large sprocket wheels 59 in this manner in a clockwise direction as viewed in FIGURE 1 carries bottles to the bottle righting mechanism 12 and this insures that the operation of the input conveyor 11 is properly related to the operation of the bottle righting mechanism 12.

BOTTLE RIGHTING MECHANISM

The input conveyor delivers the bottles to the bottle righting mechanism 12 with only one bottle being carried by each lug 68. However, some bottles may be upside down, and some bottles may be right end up. The bottle righting mechanism 12 detects which way a bottle is turned, and inverts those bottles that are upside down.

As the bottles are carried into the bottle righting mechanism, they rest on a hood 100 which is continuous with and performs the function of the plate 64 as the bottles leaves the plate 64. The hood 100 is mounted between the large sprocket wheels 59, and is supported at its forward end by a transverse channel iron 101 extending between the side walls 102 of the housing for the bottle righting mechanism 12. The hood 100 is further supported by appropriate bearings 104' around the shaft 104 on which the large sprocket wheels 59 are mounted. The hood 100 is substantially a half cylinder having a tangential tail piece 105 which is attached to the channel iron 101. Immediately below the rearward edge of the hood 100, there is a plurality of doffers 106.

Figure 3:
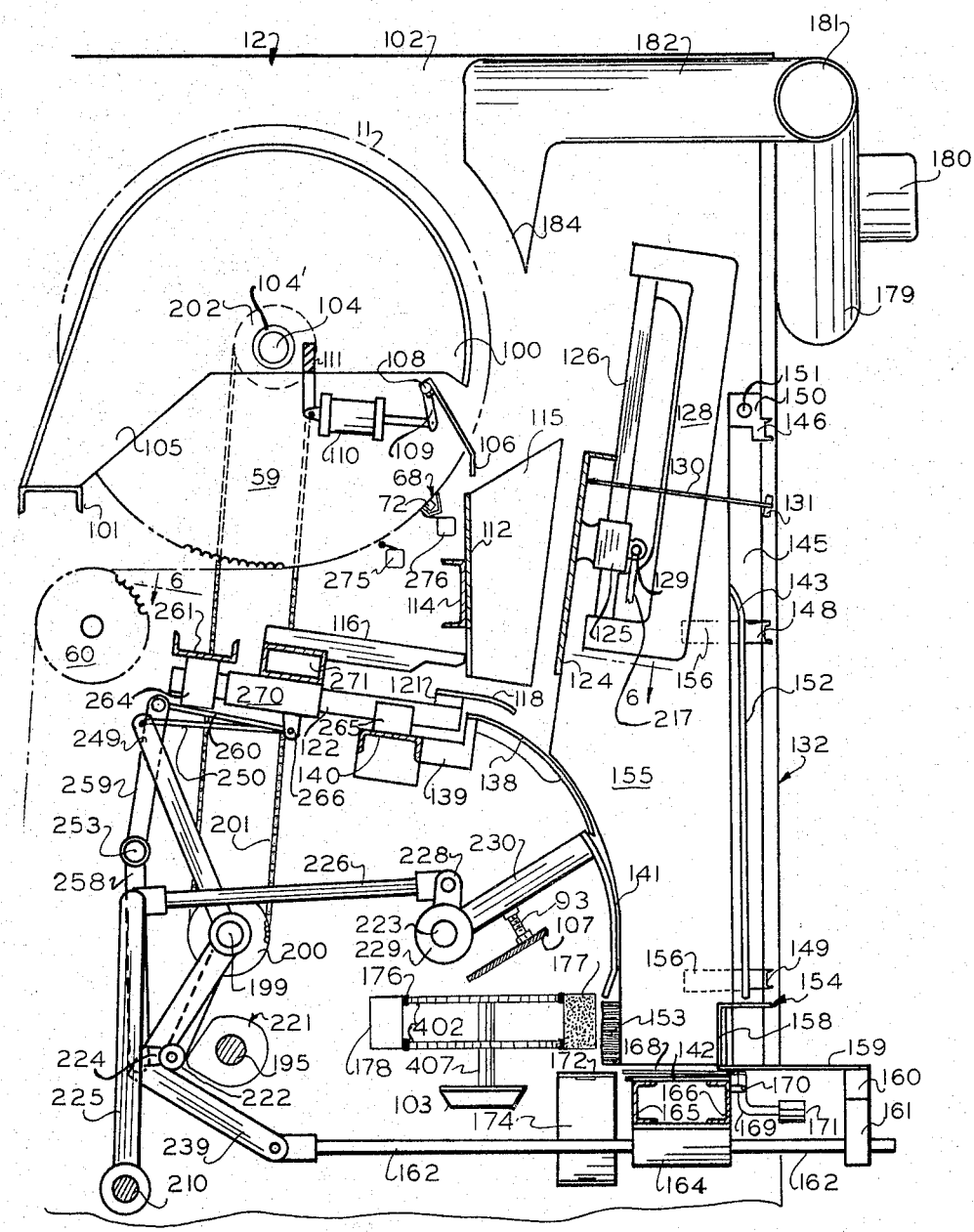
FIG. 3 is an enlarged, longitudinal cross-sectional view of the bottle righting mechanism for placing all bottles in an upright position.

The bottles in each lane 65 of the input conveyor 11 are kept separate in the bottle righting mechanism 12 by various lonigtudinal walls which extend the lanes 65 throughout the bottle righting mechanism 12. FIG. 3 shows a cross-section taken so as to show the path of bottles delivered to the bottle righting mechanism 12 in only one lane 65. Therefore, although many of the components of the bottle righting mechanism 12 are shown in FIG. 3 and described below as single components, it will be understood that each lane 65 of the input conveyor 11 is extended throughout the bottle righting mechanism in a similar manner.

The doffers 106 are secured to a common rod 108 rotatably mounted between the walls 102 of the bottle righting mechanism 12. The rod 108 is rotated by an air cylinder 110. A member 111 is extended between the two sides of the hood 100 to support the end of the air cylinder 110.

Immediately below the doffers 106, there is a plate 112 which extends the full width of the hood 100. The plate 112 is supported by being attached in known manner to a channel iron 114 extending between the walls 102 of the bottle righting mechanism 12. From the plate 112, a plurality of walls 115 extends rearwardly. The plurality of walls 115 serve to extend the lanes 65 of the input conveyor 11 within the bottle righting mechanism 12. The walls 115 extend below the plate 112 to provide an open front for entrance of kickers 116 which will be discussed later.

As a bottle is carried over the hood 100, it is doffed by a doffer 106 to prevent it from following the input conveyor 11 around the large sprocket wheels 59. As the bottle falls, it is guided by the plate 112 and two walls 115, and lands on a ledge 118. There is a ledge 118 for each lane 65 of the input conveyor 11 and in FIG. 6 it will be seen that each ledge 118 includes a substantially rectangular plate 120 having a rectangular opening 119 in the outer end thereof. Each ledge 118 is secured to a transverse member 121 which is, in turn, carried by a pair of rods 122. This construction will be described in detail later.

A gate 124 is slidably positioned rearwardly of, and vertically coextensive with, the plate 112. The gate 124 provides a closure for the fourth side of each extended lane 65 formed by the plate 112 and two walls 115, and extends transversely across the width of the hood 100. Each end of the gate 124 is attached to a slide bearing 125, and the bearings 125 are slidably carried by rods 126 which are supported in substantially U-shaped frames 128 secured in known manner to the side walls 102 of the bottle righting mechanism 12. Ears 129 on the bearings 125 are pivotally attached to arms 217 by which the bearings 125 and the gate 124 are moved as will be described below.

Behind the gate 124 and toward the upper edge thereof, there is a plurality of stops 130. The stops 130 are flat finger-like members which are supported from a bar 131 and project forwardly to terminate just short of the gate 124. FIG. 13 shows the mounting of the stops 130 in more detail. The bar 131 is rotatably mounted on vertical end members 144 and 145 by bearing blocks 134. The bar 131 is square. However, the ends of the bar 131 are rounded to be rotatable within the bearing blocks 134. Slightly inwardly of one bearing block 134 there is an adjusting plate 135 integral with the rear surface of the bar 131 and extending upwardly and downwardly from the bar 131. The ends of the adjusting plate 135 have threaded holes which receive adjusting screws 136, and the ends of the adjusting screws 136 bear against the vertical end member 145. The result of this arrangement is that the bar 131 can be rotated by varying the relative positions of the adjusting screws 136. As the bar 131 is rotated, it will carry with it the stops 130 so as to vary the vertical position of the extending ends of the stops 130.

Below each ledge 118, there is a downwardly curved arcuate plate 138, the plate 138 being supported from a bracket 139 which is attached to a transverse channel 140. The channel 140 extends between the side walls 102 of the bottle righting mechanism 12 and is supported thereby. The arcuate plate 138 is curved to deflect the bottles to a bottle guide 141 which guides the bottles to the platform 142. It will be understood that the arcuate plate 138, the bottle guide 141 and the platform 142 all extend across all extended lanes in the bottle righting mechanism 12.

The two vertical members 144 and 145 are joined by horizontal, transverse members 146, 148 and 149 to form a rear frame 132. The end members 144 and 145 are disposed on each side of the bottle righting mechanism 12 and the transverse members 146, 148 and 149 extend between the two end members 144 and 145 to hold them apart and to support other parts. The transverse member 146 is at the top of the rear frame 132, the transverse member 148 is substantially centrally located, and the transverse member 149 is close to the bottom of the rear frame 132. The members 144, 145, 146, 148 and 149 are welded or otherwise fixed together to form a rigid structure. A pair of ears 150 extends upwardly from the vertical end members 144 and 145, and, the ears 150 are provided with holes to receive a shaft 151. This arrangement allows the rear frame 132 to pivot about the shaft 151 to provide easy access to the interior of the bottle righting mechanism 12.

The rearmost end of each of the lanes 65 as extended within the bottle righting mechanism 12 is closed by a strip 152 attached to the transverse members 148 and 149 of the rear frame 132. The strips 152 terminate above the platform 142 to allow space for a pusher 154 to extend into each lane. The upper ends of the strips 152 end slightly above the central member 147, turning inwardly at 143.

In the rearmost area of the bottle righting mechanism 12, the lanes 65 established by the input conveyor 11 are maintained by walls 155 which are carried by brackets 156. The brackets 156 are attached to the transverse members 148 and 149 of the rear frame 132, and extend inwardly of the bottle righting mechanism 12. The connection of the walls 155 to the brackets 156 can be similar to that shown in FIG. 11 for the dividers 66 of the input conveyor 11. This will allow adjustment of the width of the space between the walls 155.

A brush 153 is carried by the inner edge of each wall 155. The plurality of brushes 153 extend into the spaces between walls 155 and prevent a bottle between two walls 155 from falling or sliding from the platform 142 while permitting a bottle to be forced between them and off the platform 142 when desired.

The pushers 154 are just rearward of the platform 142 and have vertical portions 158 connected to rearwardly extending horizontal portions 159. The horizontal portions 159 are connected to a transverse bar 160 which is supported by a pair of blocks 161. The blocks 161 are fixedly secured to rods 162 which are slidable longitudinally in bearings 164.

The platform 142 is a flat platform supported by a pair of channel shaped members 165 and 166 which are attached to the side walls 102 of the bottle righting mechanism 12. In each extended lane formed between walls 155, there is a shock absorbing plate 168 above the platform 142 and attached to an L-shaped arm 169. Each arm 169 is pivotally connected to the member 166 by a pivot member 170 and the outer, rearward extremity of each arm 169 has a weight 171 which tends to rotate the shock absorbing plate 168 away from the platform 142 in a clockwise direction as viewed in FIG. 3. The shock absorbing plates 168 will therefore be angularly spaced somewhat above the platform 142.

Figure 2:
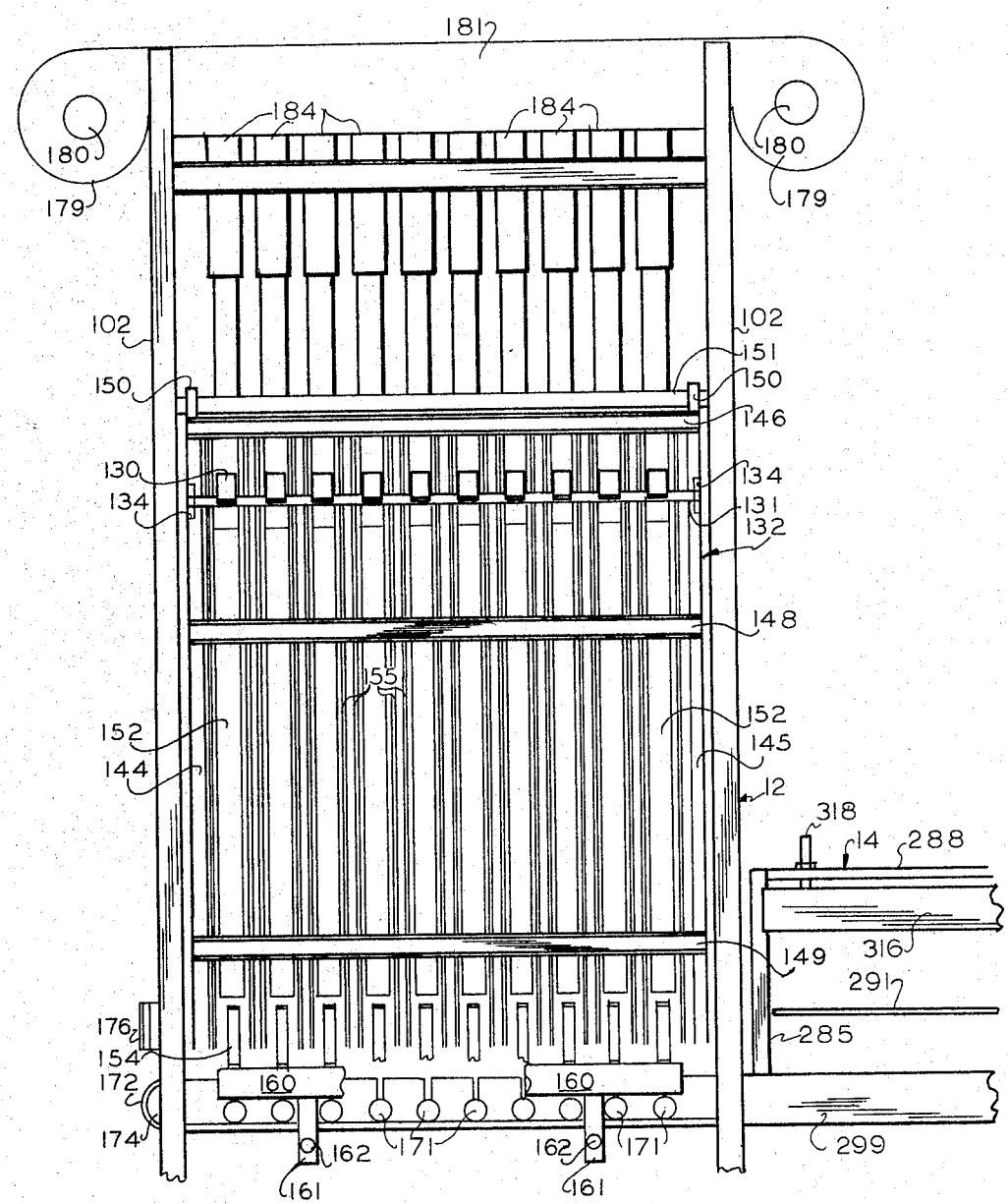
FIG. 2 is a rear elevational view, partially cut away, of the machine shown in FIG. 1.

An outfeed conveyor belt 172 is adjacent to the platform 142. The outfeed conveyor belt 172 runs over an idler pulley 174 which is seen in FIG. 2, and extends transversely through the bottle righting mechanism 12 and to a drive pulley 175 in the dimension aligning mechanism 14 seen in FIG. 16. A side chain 176 extends between sprockets 294 of the dimension aligning mechanism 14 and sprockets 402 positioned in the bottle righting mechanism 12 on a shaft 407 carried by a bracket 103 adjacent to the pulley 174. The side chain 176 travels adjacent to the outfeed conveyor belt 172 from the bottle righting mechanism 12 to the dimension aligning mechanism 14 and has lugs 178 extending over the outfeed conveyor belt 172 to hold the bottles in their travel with the outfeed conveyor belt 172.

As best seen in FIG. 18, each lug 178 has a brush 177 on the back thereof. Each lug 178 will positively engage one side of a bottle and a brush 177 will yieldably engage the opposite side of the bottle to hold the bottle firmly on the outfeed conveyor belt 172 while permitting it to rotate as will be seen later. The outfeed belt 172 and the side chain 176 are both driven in a manner to be described from the dimension aligning mechanism 14 by a shaft 187 extending from the bottle righting mechanism 12 and this arrangement insures the proper relationship between the outfeed conveyor belt 172 and the chain 176 and between the outfeed conveyor belt 172 and the other components of the bottle righting mechanism 12.

At the top of the bottle righting mechanism 12 and at the rear thereof, there are two blowers 179 driven by motors 180, both blowers 179 having their discharge into a manifold 181. From the manifold 181, a plurality of ducts 182 project into the bottle righting mechanism 12 and turn downwardly to provide nozzles 184. There is one nozzle 184 for each of the lanes 65 of the input conveyor 11 maintained within the bottle righting mechanism 12 by the various walls.

It will now be understood that as a bottle is carried over the hood 100, it falls away from the input conveyor 11 assisted by a doffer 106 which is moved toward the bottle by the air cylinder 110. The bottle falls, assisted by an air blast from a nozzle 184, and lands on a ledge 118. When a bottle lands on a ledge 118 it is in a substantially vertical position because of the action of the lugs 68, the doffers 106 and the air blast. Moreover, when a bottle lands on a ledge 118, the gate 124 is in its down position as shown in FIG. 3, and the space defined by the gate 124, the plate 112 and walls 115 is not sufficiently large to permit the bottle to land and come to rest on a ledge 118 in other than a vertical position. Thus, the gate 124, the plate 112, walls 115, and a ledge 118 serve to continue the control over bottle position first established by the input conveyor 11.

Figure 14A:
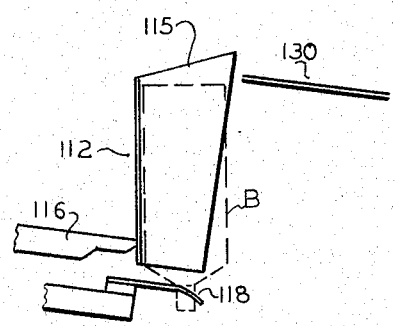
FIGS. 14a, 14b and 14c are schematic drawings showing the manner in which an upside down bottle is turned right end up by the bottle righting mechanism.
Figure 15A:
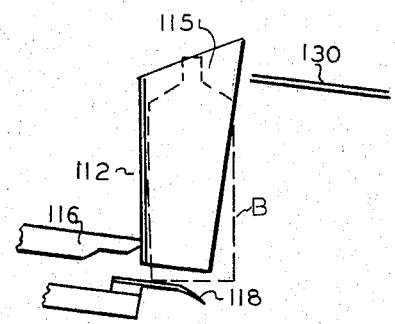
FIGS. 15a, 15b and 15c are schematic drawings showing the manner in which a right end up bottle is retained in a right end up position by the bottle righting mechanism.
Figure 14B:
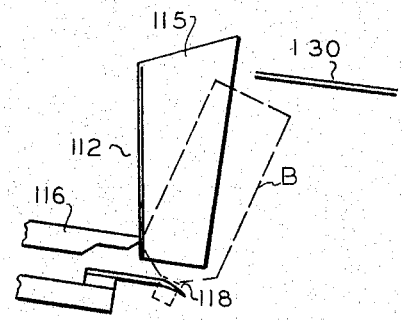
Figure 15B:
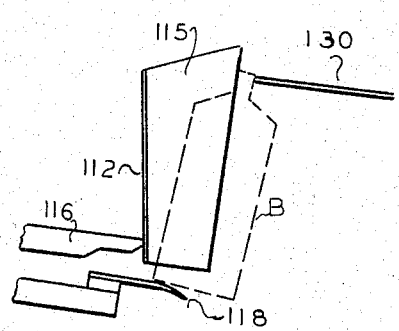
Figure 14C:
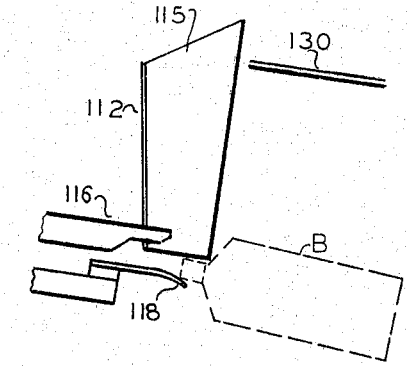
Figure 15C:
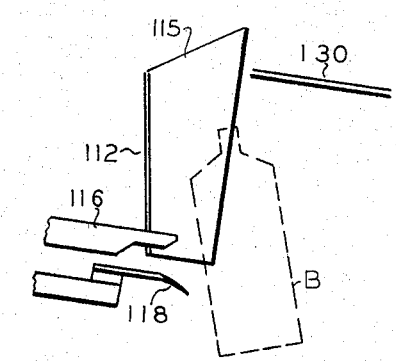

Although a bottle comes to rest on a ledge 118 in a vertical position, the bottle may be either right side up or upside down. The manner in which the bottle righting mechanism 12 rights upside down bottles and maintains right side up bottles in their proper position is best seen in FIGURES 14 and 15. In FIGURE 14a it is seen that when a bottle lands on a ledge 118 upside down, the neck of the bottle B extends into the hole 119 in the ledge 118. Each time a bottle B comes to rest on a ledge 118, the gate 124 is raised, the ledge 118 is moved to the left as viewed in FIG. 3, and the kicker 116 above the ledge 118 is moved to the right as viewed in FIG. 3. With the bottle B in an upside down position, the motion of the ledge 118 causes the bottle B to cant or tilt as shown in FIG. 14b and the motion of the kicker 116 combined with the restriction of neck motion by the hole 119 causes the bottle B to flip over the ledge 118 and drop below the ledge 118 in an upright position. The rectangular contour of the hole 119 permits the neck of a bottle B to flip out of the hole 119.

The raising of the gate 124 provides space for the bottle B to flip over and the stops 130 do not check the motion of the bottle B as it flips because the stops 130 are positioned above the path of a bottle B having its neck extending downward through a hole 119. However, when a bottle B is resting upright on a ledge 118 as shown in FIG. 15a, the stops 130 will engage the bottle B when the gate 124 raises and the ledge 118 moves to the left. This because the base of a bottle B will not enter a hole 119 and because the stops 130 are positioned to engage a bottle B when the position of its upper end is not lowered by having its neck inserted into a hole 119. The vertical position of the stops 130 is adjustable by the screws 136 to insure that the stops 130 engage only an upright bottle and to accommodate bottles of various heights.

Even though an upright bottle B is not inserted into a hole 119, the bottle B cants or tilts to engage a stop 130 because of the motion of the ledge 118 beneath it. With the bottle in this position, the action of a kicker 116 simply kicks the base of the bottle B off the ledge 118 causing it to fall beneath the ledge 118 still in its upright position.

Figure 20:
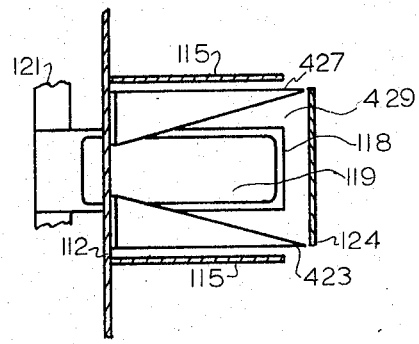
FIG. 20 is a top plan view of the second embodiment of apparatus within the bottle righting mechanism for inverting upside down bottles as seen in line 20—20 in FIGURE 19 but with the ledge and other background details omitted.
Figure 19:
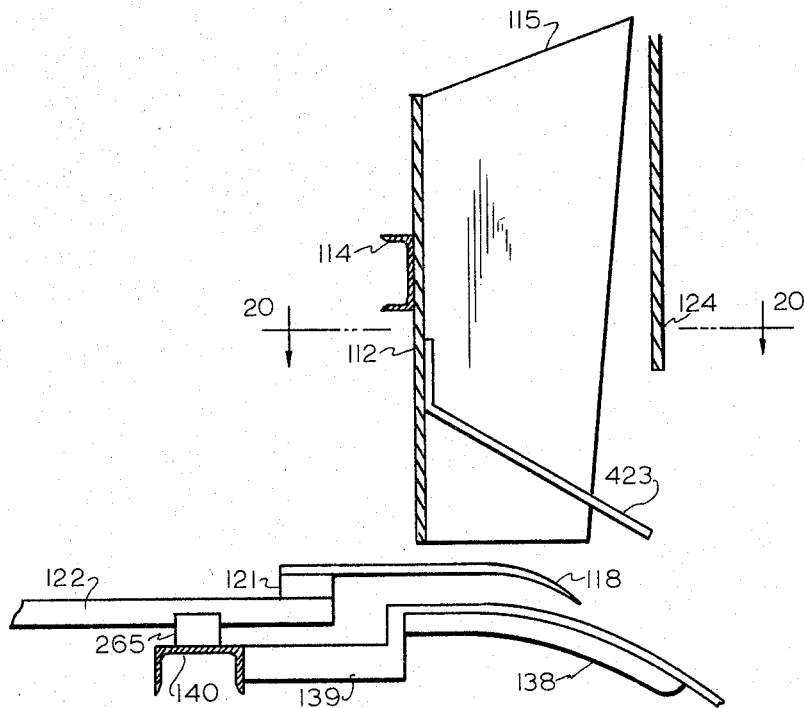
FIG. 19 is an enlarged view, partially in section of a second embodiment of apparatus within the bottle righting mechanism for inverting upside down bottles and with background details in the bottle righting mechanism omitted.

FIGURES 19 and 20 show a second embodiment of apparatus for inverting upside down bottles B in the bottle righting mechanism 12. In this second embodiment, the kicker 116 over each ledge 118 is eliminated and it will be understood that the elimination of the kickers 116 eliminates those portions of the bottle righting mechanism 12 described above and below necessary to support and move the kickers 116.

In this second embodiment of apparatus for inverting upside down bottles B, a pair of bottle support plates 423 and 427 are positioned over each ledge 118. Each bottle support plate 423 is formed as a right triangular having its first leg fixedly attached to the plate 112 and its second leg perpendicular to its first leg and extending toward the gate 124 adjacent and parallel to a wall 115. Each bottle support plate 427 is formed as a right triangle having its first leg fixedly attached to the plate 112 and its second leg perpendicular to the first leg and extending toward the gate 124 adjacent and parallel to the wall 115 on the opposite side of the ledge 118 from the wall 115 along which a bottle support plate 423 extends.

Figure 21A:
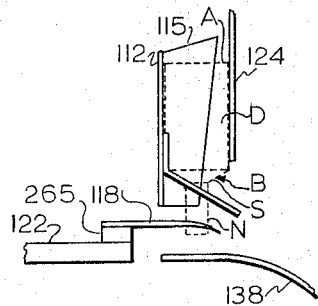
FIGS. 21a, 21b and 21c are schematic drawings showing the manner in which an upside down bottle is turned right end up by the bottle righting mechanism when the second embodiment of the apparatus for inverting upside down bottles shown in FIGURES 19 and 20 is used.

The bottle support plates 423 and 427 are inclined downward as they extend from the plate 112 toward the gate 124 and the hypotenuse of each bottle support plate 423 forms with the hypotenuse of a bottle support plate 427 a substantially V-shaped opening 429 over each ledge 118. FIGURES 21 and 22 show the manner in which the bottle support plates 423 and 427 cooperate to invert or not invert a bottle B depending upon whether the bottle B is upside down or right end up.

Figure 21B:
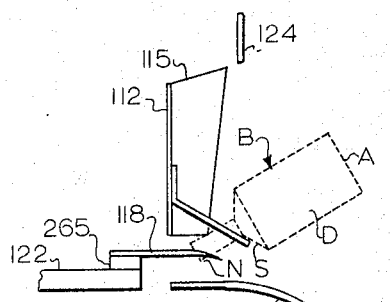
Figure 21C:
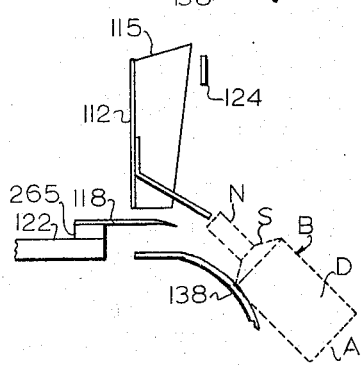

As shown in FIG. 21, when a bottle B falls toward a ledge 118 in an upside down position, its shoulder S engages the bottle support plates 423 and 427 positioned over the ledge 118 and its neck N extends through the opening 429 between the bottle support plates 423 and 427 and into the opening 119 in the ledge 118. The bottle B is initially in a vertical position because it is within the space or chamber defined by the plate 112, the gate 124, and two walls 115. However, when the gate 124 subsequently raises as shown in FIG. 21b, the inclined positions of bottle support plates 423 and 427 cause the shoulder S of the bottle B to slide downward along the bottle support plates 423 and 427. Since lateral motion of the neck N of the bottle B in the same direction as its shoulder S is restricted by the neck N being inserted in the hole 119 in the ledge 118, this motion of the shoulder S causes the body D of the bottle B to cant or tilt away from the plate 112.

As the shoulder S of the bottle B continues to slide downward along the bottle support plates 423 and 427 and as the bottle B continues to cant or tilt away from the plate 112, the ledge 118 in which the neck N of the bottle B is inserted is moved to the left as viewed in FIG. 21. This causes the neck N of the bottle B to move to the left as viewed in FIG. 21 and this motion of the neck N when added to the motion of the base A of the bottle B resulting from the tilting of the bottle B as its shoulder S slides downward on the bottle support plates 423 and 427 causes the bottle B to flip into a position with its neck N uppermost.

When the bottle B flips in the above described manner, the engaging of the shoulder S of the bottle B by the bottle support plates 423 and 427 provides a pivot point or line for the motion of the bottle B, the neck N of the bottle B moves upward through the opening 429 between the plate 112 and the body D of the bottle B, and the body D of the bottle B moves downward between the extending ends of the bottle support plates 423 and 427. Thus, it will be seen that the width of the opening 429 between the bottle support plates 423 and 427 varies from that width which will not permit the shoulder S and the body D of a bottle B to pass between the bottle support plates 423 and 427 to that width at the extending ends of the bottle support plates 423 and 427 which will permit the body D of the bottle B to pass between the bottle support plates 423 and 427. It will also be seen that for best operation of the apparatus, the ledge 118 is moved to the left as described just before the shoulder S reaches the extending ends of the bottle support plates 423 and 427 and while the shoulder S is still engaging the bottle support plates 423 and 427.

Figure 22A:
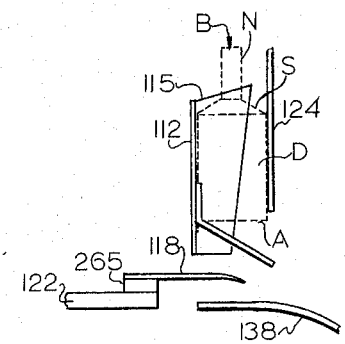
FIGS. 22a, 22b and 22c are schematic drawings showing the manner in which a right end up bottle is retained in a right end up position by the bottle righting mechanism when the second embodiment of the apparatus for inverting upside down bottles shown in FIGURES 19 and 20 is used.
Figure 22B:
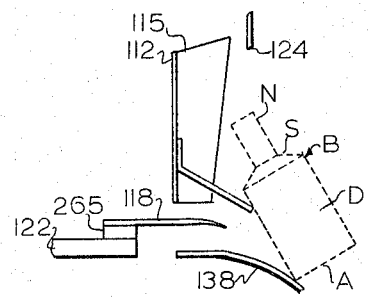
Figure 22C:
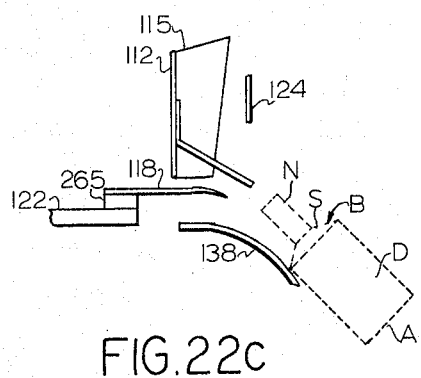

As shown in FIG. 22A, when a bottle B falls toward a ledge 118 neck or right end up, its base A engages the bottle support plates 423 and 427. Since the base A of the bottle B will not pass between the bottle support plates 423 and 427 adjacent to the plate 112, the bottle B is positioned on the bottle support plates 423 and 427 within the space or chamber defined by the plate 112, the gate 124, and adjacent walls 115. As the gate 124 is raised, the base A slides down the inclined surface of the bottle support plates 423 and 427 to fall, base A first, from the bottle support plates 423 and 427. The gate 124 as it raises restricts the motion of the shoulder S of the bottle B to insure that the bottle B remains upright as it slides from the bottle support plates 423 and 427 and it will be understood that when this second embodiment of apparatus for inverting bottles is used, the stops 130 are eliminated.

As the bottles fall below the ledges 118 all in an upright position, they hit the plate 138 and slide down across the bottle guide 141 to a shock absorbing plate 168 and the platform 142. The air blast from the nozzle 184 continues to give an effectively greater weight to the bottles as they fall. Thus, when the bottles hit the shock absorbing plates 168, the bottles cause them to move toward the platform 142. The motion of the shock absorbing plates 168 is resisted by the weights 171 and the arrangement absorbs some of the energy of the bottles and prevents bouncing of the bottles. As the bottles come to rest on the shock absorbing plates 168 and the platform 142 beneath the shock absorbing plates 168, the bottle guide 141 moves up and the pushers 154 move toward the bottles and push the bottles onto the outfeed conveyor belt 172 between a lug 178 and a brush 177.

DIMENSION ALIGNING MECHANISM

The dimension aligning mechanism 14 is best shown in FIGS. 16, 17 and 18, and the manner in which it is attached to the bottle righting mechanism 12 is best shown in FIG. 2. The dimension aligning mechanism 14 includes a pair of longitudinally extending side members 280 and 281 joined by end plates 282 and 284 to form a rectangular base. The end plates 282 and 284 support vertical arms 285 and 286 and the upper ends of the vertical arms 285 and 286 have a beam 288 extending horizontally between them.

A horizontal plate 289 is attached to and between the upper sides of the side members 280 and 281. The horizontal plate 289 supports a spacer member 290 to which is attached a guide plate 291. The spacer member 290 maintains the guide plate 291 parallel to and above the horizontal plate 289 and a vertical shaft 292 rotatably extends through the guide plate 291 and the horizontal plate 289. One of the sprockets 294 is fixedly mounted on the shaft 292 above the guide plate 291 and the other sprocket 294 is fixedly mounted on the shaft 292 between guide plate 291 and the horizontal plate 289 and the side chain 176 carried by the sprockets 294 encloses the guide plate 291 in its path to and from the bottle aligning mechanism 14.

The contour of the guide plate 291 determines the path of the side chain 176 in the dimension aligning mechanism 14 and the contour of the guide plate 291 is selected to place the side chain 176 above and adjacent to an edge of the horizontal plate 289 as the side chain 176 enters the bottle aligning mechanism 14 and inward of this edge as the side chain 176 approaches the sprockets 294. The outfeed conveyor belt 172 enters the dimension aligning mechanism 14 from the bottle righting mechanism 12 along the same edge of the horizontal plate 289 and this arrangement causes the lugs 178 to be over the outfeed conveyor belt 172 as it enters the dimension aligning mechanism 14 and to move inward of the outfeed conveyor belt 172 as it and the lugs 178 move through the dimension aligning mechanism 14.

The outfeed conveyor belt 172 is positioned adjacent to this edge of the horizontal plate 289 by mounting the pulley 175 which carries the outfeed conveyor belt 172 in the dimension aligning mechanism 14 on a shaft 295 rotatably extending through the side member 280 below the horizontal plate 289. The shaft 295 also extends between the side members 280 and 281 and through the side member 281.

An outer plate 299 is positioned parallel to the side member 280 with the pulley 175 between it and the side member 280. The shaft 295 is at that end of the dimension aligning mechanism 14 most remote from the bottle righting mechanism 12 and a shaft 298 rotatably extends between the side member 280 and the outer plate 299 at that end of the dimension aligning mechanism 14 adjacent to the bottle righting mechanism 12. The shafts 295 and 298 are parallel to each other in a horizontal plane of reference and the shaft 298 carries a pulley 293, which in turn carries one end of a discharge conveyor belt 296. The discharge conveyor belt 296 extends from the pulley 293 between the outer plate 299 and the outfeed conveyor belt 172 to a work station or apparatus (not shown) for utilizing the properly oriented bottles as they leave the dimension aligning mechanism 14.

Guide rods are mounted over the outfeed conveyor belt 172 and the discharge conveyor belt 296 to direct bottles moving on the outfeed conveyor belt 172 between lugs 178 of the side chain 176 to the discharge conveyor belt 296. There are two inner rods 300, one above the other, which run parallel and adjacent to the inner edge of the outfeed conveyor belt 172, thence angle diagonally across the outfeed conveyor belt 172, and thence run parallel and adjacent to the inner edge of the discharge conveyor belt 296. Two outer guide rods 301, positioned one above the other, extend in similar manner parallel and adjacent to the outside edge of the outfeed conveyor belt 172, thence angle across the discharge conveyor belt 296, and thence parallel and adjacent to the outer edge of the discharge conveyor belt 296.

The guide rods 300 and 301 originate where the outfeed conveyor belt 172 enters the dimension aligning mechanism 14 and terminate where the discharge conveyor belt 296 leaves the dimension aligning mechanism 14. The space between the inner guide rods 300 and the outer guide rods 301 where they originate is greater than the space between them where they terminate. As a result, bottles moving between the inner guide rods 300 and the outer guide rods 301 from the outfeed conveyor belt 172 to the discharge conveyor belt 296 pass into a narrow channel 302.

The inner guide rods 300 are positioned by horizontal arms 305 which extend between sleeves 303 on the inner guide rods 300 and vertical posts 306 mounted on the side member 280 and the outer guide rods 301 are positioned by horizontal arms 308 which extend between sleeves 307 on the outer guide rods 301 and vertical posts 309 mounted on the outer plate 299.

Above and parallel with the outfeed conveyor belt 172 is a top holding belt 310. The top holding belt 310 is carried by pulleys 311 and 312 which are mounted on transverse shafts 314 and 315 respectively. The shafts 314 and 315 are rotatably mounted in a vertically movable carriage 316 supported from the beam 288 by a pair of screws 318 which pass through holes (not shown) in the beam 288 and are positioned with respect to the beam 288 by nuts 319. The vertical position of the screws 318 and of the carriage 316, is varied in known manner by turning the nuts 319.

The dimension aligning mechanism 14 is driven from an end of the shaft 187 which projects from the bottle righting mechanism 12 toward the dimension aligning mechanism 14. A gear 320 mounted on the extending end of the shaft 187 engages a gear 321 mounted on a shaft 322 which is rotatably carried by plates 324, 325 and 326 extending downward from the outer plate 299. The plate 325 is between the plates 324 and 326 along the length of the dimension aligning mechanism 14 and is close to the lower end of the vertical shaft 292 and a bevel gear 328 is secured to the shaft 322 adjacent to the plate 325. The bevel gear 328 engages a bevel gear 329 on the lower end of the vertical shaft 292. The shaft 322 terminates just beyond the plate 326 where it carries a bevel gear 330 which engages a bevel gear 331 mounted on a transverse shaft 332. Thus, rotation of the shaft 187 by the motor 185 mounted in the bottle righting mechanism 12 causes rotation of the shafts 292 and 332.

The transverse shaft 332 extends transverse to the length of the dimension aligning mechanism 14 between a plate 334 extending downward from the outer plate 299 and a second mounting plate (not shown) which extends downward from the side member 281 and carries sprocket wheels 503 and 507.

The sprocket wheel 503 is operatively joined by a chain 339 to two idler sprocket wheels 335 and 336 carried by the second mounting plate (not shown) and to a sprocket wheel 340 mounted on the shaft 315 with the pulley 312. The sprocket wheel 507 is operatively joined by a chain 338 to a sprocket wheel 703 mounted on the shaft 295. Thus, rotation of the shaft 332 by the shaft 322 causes motion of the outfeed conveyor belt 172 and the top holding belt 310 and since the shaft 292 is also rotated by rotation of the shaft 322, the motion of the side chain 176 is directly related to the motion of the belts 172 and 310.

The result of this arrangement is that after entering the dimension aligning mechanism 14, an upright bottle has one side engaged by a lug 178, its opposite side engaged by a brush 177, its top engaged by the top holding belt 310, and its bottom resting on the outfeed conveyor belt 172. The lug 178, the brush 177, the holding belt 310 and the outfeed conveyor belt 172 holding the bottle all move together because of their common dependence upon the rotation of the shaft 322 for motion. Thus, each bottle is held in upright position as it enters the dimension aligning mechanism 14. However, the bottle will rotate about its lengthwise axes extending between the holding belt 310 and the outfeed conveyor belt 172.

The bottle is also moving between the inner guide rods 300 and the outer guide rods 301 and the space between the inner guide rods 300 and the outer guide rods 301 as the bottle enters the dimension aligning mechanism 14 is sufficiently large for an oval or elliptical bottle to move with either its long or short axis transverse to its direction of motion. However, the brushes 177 tend to cause an oval or elliptical bottle B' to orient itself between a lug 178 and a brush 177 with its longer horizontal axis perpendicular to its direction of travel as shown in FIG. 18.

As a bottle B' continues to move through the bottle aligning mechanism 14, it starts to be forced from the outfeed conveyor belt 172 to the discharge conveyor belt 296 by the guide rods 300 engaging its side. Since the space between the guide rods 300 and 301 as they extend on opposite sides of the outfeed conveyor belt 172 is greater than the longer horizontal axis of the bottle B', this results in that side of the bottle B' engaged by the rods 300 being retarded as to motion and in the opposite side being free to move. The retarding of one side of the bottle B' by the guide rods 300 causes the bottle B' to rotate about its lengthwise axis into a position in which its longer horizontal axis extends in its direction of travel as shown in FIG. 18.

This rotation of a bottle B' occurs while the bottle B' is still between the holding belt 310 and the outfeed conveyor belt 172 and as the bottle B' is moving away from its position between a lug 178 and a brush 177 because of the guide rods 300 and the inward motion of the lugs 178 resulting from the curvature of the guide plate 291. This permits the holding belt 310 and outfeed conveyor belt 172 to hold the bottle B' as it rotates so as to prevent it from falling or toppling and permits the final rotation of the bottle B' to occur without the restriction of the brush 177.

After rotation, the bottle B' moves with its longer horizontal axis parallel to its direction of motion and the guide rods 300. After a bottle B' has been moved from the outfeed conveyor belt 172 to the discharge conveyor belt 296 by the action of the guide rods 300, the decreasing space between the guide rods 300 and 301 permits the guide rods 300 and 301 to insure that the bottle B' does not fall or topple as it continues to move with the discharge conveyor belt 296 of the dimension aligning mechanism 14. It will be understood that a round bottle passing through the dimension aligning mechanism 14 will experience the same drag on one side. However, the rotation of a round bottle will normally have no functional significance.

DRIVE AND TIMING MECHANISM

The bottle orienting machine of the invention is driven by a motor 185 which, as shown in FIG. 1, is in the lower rear portion of the bottle righting mechanism 12. The motor 185 drives a variable pulley 186 on a gear reducer 188 by a belt 186'. The output shaft of the gear reducer 188 has a sprocket 189 which drives, through a chain 190, a sprocket 191 on the shaft 187. A sprocket 192, mounted coaxially with the sprocket 191 on the shaft 187, drives, through chain 193, a sprocket 194 which is mounted on a cam shaft 195. The shaft 187 also drives the dimension aligning mechanism 14 as described above.

On the opposite end of the cam shaft 195 from the sprocket 194 is a gear 196 which is meshed with a gear 198 on a transverse shaft 199. The transverse shaft 199 is parallel to the cam shaft 195 and adjacent to the gear 198 on the shaft 199 is a sprocket 200 having a chain 201 which drives a sprocket 202 on the shaft 104. Since the shaft 104 carries the large sprocket wheels 59, it is from the shaft 199 that the input conveyor 11 is driven.

The cam shaft 195 mounts a plurality of cams which activate the various parts of the bottle righting mechanism 12 in timed sequence to achieve the operation of the bottle righting mechanism 12 described above.

There is a gate cam 205 near each end of the shaft 195 and each gate cam 205 cooperates with a cam follower 206 to open the gate 124. The cam followers 206 and their associated levers are the same on both sides of the machine and only one cam follower 206 will be described in detail.

Each cam follower 206 is mounted on the end of an arm 208 of a bell-crank 209. The bell-crank 209 is pivotally secured to a transverse shaft 210 which is mounted between the walls 102 of the bottle righting mechanism 12 and parallel to the cam shaft 195. The second arm 211 of the bell-crank 209 extends upwardly, and is urged to the left as viewed in FIG. 1 by a spring 212 having one end fixedly positioned within the bottle righting mechanism. The upper end of the arm 211 has a link 214 pivotally attached thereto. The link 214 is in turn attached at its second end to another bell crank 215 pivotally mounted on a shaft 401 extending between the sides 102. The second arm of the bell crank 215 is connected to an arm 217 which is in turn attached to an ear 129 on a bearing 125 as previously described.

As described above, the gate 124 rises, stays up until a bottle is removed from a ledge 118; and then stays down until another bottle is in position on the ledge 118. To accomplish this movement of the gate 124, the gate cams 205 have a low dwell portion 216 which allows the springs 212 to maintain the gate 124 in lowered position. The dwell portion 216 of each gate cam 205 is joined by a rapid rise portion 218 which is in turn continuous with a high dwell portion 219. The rapid rise portions 218 of the gate cams 205 raise the gate 124 and the high dwell portions 219 keep the gate 124 up as long as is necessary. The portion 220 on each gate cam 205 allows the gate 124 to lower.

Adjacent to the gate cams 205 on the shaft 195 are pusher cams 236. Each pusher cam 236 has a cam follower 238 and each cam follower 238 is rotatably secured to the vertex of an angular arm 239 which is pivotally carried by the shaft 199 above the vertex and which extends downwardly and rearwardly below the vertex. The lower end of an arm 239 has a rod 162 attached thereto and each rod 162 is slidably carried by the bearing 164, as previously described. Each pusher cam 236 has a low dwell portion 240, followed by a rapid rise portion 241. There is a rather slow return portion 242 connecting the rapid rise portion 241 to the low dwell portion 240. This allows the pushers 154 to move bottles quickly to the outfeed conveyor belt 172 as already described and to return.

Adjacent to a pusher cam 236 is a bottle guide cam 221. The bottle guide cam 221 has a cam follower 222 which is mounted on a bracket 224 carried by an arm 225. At its lower end, the arm 225 is pivotally connected to the shaft 210 and at its upper end, the arm 225 is pivotally connected to a link 226. The link 226 extends rearwardly in the bottle righting mechanism 12 and connects to an ear 228 on a hub 229 rotatably mounted on a shaft 223 extending between walls 102. An arm 230 extends from the hub 229 and it is to the extending end of the arm 230 that the bottle guide 141 is attached. Since the bottle guide 141 is down as a bottle falls to the platform 142, and rises for the bottle to be pushed onto the conveyor belt 172 by a pusher 154, the bottle guide cam 221 has a low dwell portion 231, a relatively fast rise 232, a high dwell portion 234, and a relatively fast lowering portion 235. The downward motion of the bottle guide 141 is checked by a stop 93 extending from a plate 107 and engaging the arm 230.

Adjacent to the bottle guide cam 221 on the shaft 195 is the kicker cam 244. The kicker cam 244 has a long low dwell portion 245 and one protrusion 246 which gives a very fast rise and return so that the kickers 116 move out and back quite rapidly. The cam follower 248 which follows the kicker cam 244 is carried by the lower end of an arm 249 pivotally mounted on the shaft 199. The upper end of the arm 249 extends upward above the shaft 199 and has a link 250 connected to it. Motion of the link 250 moves the kickers 116 as described below.

Adjacent to the kicker cam 244 on the shaft 195 is the ledge cam 251. The ledge cam 251 has a long high dwell 252, a rapid fall 255, a brief low dwell 254, and a rapid rise 253. The cam follower 256 for the ledge cam 251 is carried by an arm 258 which is mounted at its other end on a shaft 253 extending between the walls 102. Extending from the shaft 253 are two arms 259 each connected at its upper end to a link 260. Motion of the links 260 with rotation of the shaft 253 by the arm 258 moves the ledges 118 as described below.

The ledges 118 and the kickers 116 are supported by channel members 140 and 261 which extend between the sides 102 of the bottle righting mechanism 12. The ledges 118 are carried by the transverse member 121 supported by the two shafts 122. Each shaft 122 is slidably mounted in a bearing 264 rigidly attached to the channel 261 and by an open bearing 265 mounted on the channel 140. The arrangement to move the ledges 118 is best shown in FIG. 7. Each shaft 122 has an L-shaped member 266 attached to its under side between a bearing 264 and a bearing 265 by a bolt 268 and a link 260 extending from an arm 259 mounted on the shaft 253 is pivotally attached to each L-shaped member 266 by extending the link 260 into a bracket 269 mounted on each L-shaped member 266. Rotation of the shaft 253 by the cam follower arm 258 moves the plurality of arms 259 and the ledges 118 in accordance with the configuration of the ledge cam 251.

A partially open bearing 270 is slidably mounted on each shaft 122 above the L-shaped member 266 and a rectangular tubular member 271 is mounted on and between bearings 270 above and transverse to the shafts 122. The member 271 carries the kickers 116. The kickers 116 are rectangular shaped members and are attached to the member 271 by welding or other known means and each kicker 116 extends above and over a ledge 118. The bearings 270 allow the member 271, which carries the kickers 116, to move on the shafts 122, but independently of the shafts 122. A bracket 272 is attached to the tubular member 271 and the link 250 is connected between the bracket 272 and the cam follower arm 249. Thus, motion of the cam follower arm 249 in response to the kicker cam 244 moves all of the plurality of kickers 116. It will be understood that when the second embodiment of apparatus for inverting upside down bottles is used, the kicker cam 224 and the structures described for supporting and moving the kickers 116 are eliminated.

The cams described control the operation of all components of the bottle righting mechanism with the exception of the air cylinder 110 for the doffers 106. The air cylinder 110 for the doffers 106 is controlled by two microswitches 275 and 276 which are mounted adjacent one of the large sprocket wheels 59. The positions of the microswitches 275 and 276 cause them to be engaged by lug bars 70 as the lug bars 70 move with the chains 69. Thus, the lug bars 70 act as the switch activators for the microswitches 275 and 276.

The doffers 106 are retracted between bottles and move outwardly as bottles pass them. Since the bottles are carried by the lugs 68 on the lug bars 70 of the input conveyor 11, the arrangement described times the doffers 106 to the input conveyor 11 and to the bottles carried by the lug bars 70. The switch 276 is first closed by one bar 70, and this acts through known circuitry to project the rod of the air cylinder 110 and pivot the doffers 106 outwardly to doff the bottles. The same lug bar 70 then contacts the switch 275 which causes the rod of the air cylinder 110 to retract until the next lug bar 70 moves into position and causes a repetition of the cycle.

OPERATION

In the operation of the bottle orienting machine disclosed herein, bottles are fed into the hopper in known manner and fall to the dribble belt 30. As the dribble belt 30 is driven, the bottles fall from the dribble belt 30 to the rollers 21. The baffles 28 and 29 insure a random array of bottles and increase the chance of a bottle falling directly between the adjacent rollers 21 to the input conveyor 11. However, if a bottle lands on the rollers 21, the rotational oscillation of the rollers 21 causes it to fall from the rollers 21 and land on the input conveyor 11 beneath the rollers 21.

The bottles are carried by the input conveyor 11 from under the rollers 21 and up the incline 58. Initially, bottles are on top of each other as they leave the hopper 10. However, because of the configuration of the lugs 68, only one bottle can be held securely by a lug as the bottles move up the incline 58 and as a result excess bottles fall by gravity to a lower portion of the input conveyor 11 between the walls 85 where they will be engaged by lugs 68 not already carrying a bottle. This accumulation of bottles between the walls 85 not only limits the bottles reaching the bottle righting mechanism 12 but it also provides accumulated bottles to maintain a steady input to the bottle righting mechanism 14.

The bottles are carried by the input conveyor over the hood 100 and when a bottle reaches a doffer 106, a lug bar 70 has reached the microswitch 276 which will act through its circuit to cause the air cylinder 110 to project a doffer 106 into the path of travel of the bottle. This insures that the bottle falls from the lug 68 of the input conveyor 11 and down along the plate 112. This motion of the bottle is assisted by the continuous air flow from a nozzle 184. Shortly after the bottle passes the doffer 106, the lug bar 70 engages the microswitch 275 and causes the air cylinder to pull the doffer 106 back into position to doff the next bottle in the lane 65.

If the bottle is upside down when it passes the doffer 106 it will land on the ledge 118 with its neck projecting through the hole 119 in the ledge 118, as shown in FIG. 14a. With the bottle in this position, the gate 124 rises as the cam follower 206 rides over the rise portion 218 of the gate cam 205. When the gate 124 is fully up, the cam follower 256 rides over the portion 255 of the ledge cam 251 and the ledge 118 retracts. The retraction of the ledge 118 causes the bottle to cant as shown in FIG. 14b. This is because the neck of the bottle is moved by the ledge 118 while the plate 112 restricts movement of the upper portion of the bottle. After the bottle is placed in canted position, the cam follower 248 rides over the projection 246 on the kicker cam 244 and causes a kicker 116 to engage the bottle and turn it right side up as previously described. If the second embodiment of apparatus for inverting upside down bottles is used, the bottle will land on the bottle support plates 423 and 427 and be inverted in the manner described above. However, regardless of the apparatus used to invert the bottle, the bottle falls to plate 138, slides along the bottle guide 141, and lands upright on the platform 142.

If the bottle is right side up when it passes the doffer 106, it will land on the ledge 118 with its base simply resting on the ledge 118. With the bottle in this position, the motion of the gate 124, ledge 118, and kicker 116 described above will simply cause the bottle to fall upright because of the stops 130 as earlier described.

When the kicker 116 is partly projected, the ledge cam 251 starts to return the ledge 118 to its normal projected position. The kicker 116 starts to return to its normal retracted position as soon as it is fully projected since there is no high dwell portion on the kicker cam 244. Thus, the ledge 118 and the kicker 116 return to normal position at about the same time. After the bottle has cleared the gate 124, the gate 124 begins to lower. The gate cam 205 lowers the gate 124 before another bottle reaches a doffer 106. If the second embodiment of apparatus for inverting upside down bottles is used, the kickers 116 are eliminated and a right side up bottle will simply slide from the bottle support plates 423 and 427 in right side up position as the gate 123 raises. The described motion of the ledges 118 will not influence the bottle and the gate 123 will lower as described before another bottle reaches a doffer 106.

Just as the bottle reaches the platform 142, the cam follower 222 riding on the rise portion 232 of the guide cam 221 raises the bottle guide 141. When the bottle guide 141 is fully raised, the cam follower 238 is on the rise portion 241 of the pusher cam 236 and causes a pusher 154 to engage the bottle and push it past brushes 153 onto the outfeed conveyor belt 172 between a link 178 and a brush 177.

The sequence of operation described is obtained by adjusting the positions of the various cams on the cam shaft 195 in known manner. The timing of the operations within the bottle righting mechanism 12 is easily maintained since all cams rotate together on the same shaft 195. Moreover, the timing of the pushers 154 with the outfeed conveyor belt 172 and side chain 176 is easily obtained in known manner since the shaft 187 by which the outfeed conveyor belt 172 and side chain 176 are moved and the shaft 195 carrying the pusher cam 236 are joined by the chain 193.

After being pushed onto the outfeed conveyor belt 172, the bottle transverses and leaves the bottle righting mechanism 12 and enters the dimension aligning mechanism 14. The bottle is carried in the dimension aligning mechanism 14 as already described and as the bottle passes between the guide rods 300 and 301, one side of the bottle will drag on the inner rods 300. As already described, this causes the bottle to rotate about its vertical axis and insures that an oval or elliptical bottle has its longer dimension longitudinally of the dimension aligning mechanism when it passes through the space 302. The guide rods 300 and 301 serve only as guides to prevent falling for a round bottle since it may be oriented at random about its vertical axis.

Thus, the bottle orienting machine of the invention discharges bottles in an upright position and with oval shaped bottles arranged about their vertical axes in the same manner. The machine is particularly adapted to bottles of light weight material such as plastic since lateral support to prevent the bottles from tipping over is provided in connection with each operation performed within the bottle righting mechanism 12 and the dimension aligning mechanism 14. Moreover, the forced air and guide surfaces within the bottle righting mechanism 12 serve to maintain the bottles in upright position as they move within the bottle righting mechanism 12 without lateral support.

Although the hopper 10 and input conveyor 11 will discharge bottles individually to any appropriate piece of apparatus, although the bottle righting mechanism 12 will discharge bottles in upright position to apparatus other than the dimension aligning mechanism 14, and although the dimension aligning mechanism 14 will orient upright bottles from any appropriate piece of apparatus about their vertical axis, it is the bottle orienting machine of the invention as a whole which completely orients randomly arranged bottles for filling or other operations. Each portion of the machine is functionally related to other portions of the machine in the obtaining of this result and all portions are particularly suited as a combination to bottles of plastic or other light material.

It will be understood that the device here presented is by way of illustration only, and is meant to be in no way restrictive. Therefore, numerous changes and modifications may be made, and the full use of equivalents resorted to, without departing from the spirit or scope of the invention as outlined in the appended claims.

What is claimed as invention is:

1. A machine for orienting randomly-arranged bottles, each of said bottles having a lengthwise axis and an upper end and said machine comprising, in combination, a hopper having a plurality of rollers positioned parallel to each other and with the distance between adjacent rollers being just sufficient for a bottle to pass between adjacent rollers with its lengthwise axis parallel to the said rollers, a bottle righting mechanism having means for positioning said bottles with the upper ends of all bottles extending in the same direction, and an input conveyor extending from beneath the said rollers to the said bottle righting mechanism.

2. A machine for placing randomly-arranged bottles all in the same position, each of said bottles having a lengthwise axis, a diameter perpendicular to said lengthwise axis, and a base and said machine comprising, in combination, receiving means for receiving said randomly-arranged bottles and arranging said bottles with their lengthwise axes extending in the same direction; an input conveyor with a first end positioned to receive bottles from said receiving means and a second end, said input conveyor having a plurality of dividers extending from its first end to its second end and forming a plurality of lanes with the width of each lane being substantially equal to the diameters of the said bottles, and a plurality of lugs moving in each of said lanes from the said first end to the said second end with each of said lugs having a surface just sufficiently large to engage the base of one of the said bottles, and said input conveyor being inclined between its first end and second end at an angle sufficiently great to cause a bottle not engaging the said surface of one of the plurality of lugs to fall by gravity; and a bottle righting mechanism positioned adjacent to the said second end of the input conveyor, said bottle righting mechanism having means for removing said bottles from the said input conveyor and for placing each bottle with its base lowermost.

3. A machine for placing bottles all in the same position, said machine comprising, in combination, means for receiving said bottles and arranging said bottles with their lengthwise axes extending in the same direction; a first conveyor means for removing said bottles from the said receiving means; a bottle righting mechanism positioned adjacent to said first conveyor means and having a doffer to doff said bottles from said first conveyor means and righting means adjacent to said doffer for inverting those of said bottles which are upside down; a second conveyor means for discharging said bottles; and means positioned between the said second conveyor means and said bottle righting mechanism for placing said bottles on said second conveyor means.

4. A device for inverting a bottle having a base, a shoulder, a body between said base and shoulder, and a neck extending downward from said shoulder, said device comprising a ledge having an opening just sufficiently large to receive the neck of the said bottle; a plate above and substantially perpendicular to the said ledge; a stop above the said ledge in a plane of reference on the opposite side of the said ledge from the said plate, said stop being a distance from the said ledge which is greater than the length of the body of the said bottle and less than the total length of the said bottle; a kicker above said ledge adjacent to that side of the bottle most remote from the said stop when the bottle is positioned on the said ledge; means for positioning said bottle on said ledge; means for moving the said ledge away from the said plane of reference; and means for moving the kicker toward said bottle subsequent to the motion of the said ledge.

5. An aligning mechanism for aligning the longer horizontal axis of each of a plurality of bottles in the same direction, each of said bottles having a top, a bottom, and sides at opposite ends of said horizontal axis and said mechanism comprising, in combination, a base support means for supporting the base of each of the plurality of bottles; a top holding means engaging the top of each of the plurality of bottles for maintaining each of the plurality of bottles upright on the base support means, said top support means and said base support means serving to impart linear motion to the plurality of bottles; and means for retarding the linear motion of one of the said sides of each of the plurality of bottles.

6. A device for inverting bottles, each bottle having a neck and a body, said device including first means for supporting a bottle, power means for moving the neck of a bottle laterally in a first direction, and second power means for urging the body of said bottle laterally in a second direction opposite to said first direction, the arrangement being such that motions of said first power means and said second power means will pivot said bottle from said first means about an axis above said first means.

7. The device as claimed in claim 6, said first means including a ledge having a hole therein for receiving the neck of a bottle.

References Cited by the Examiner
UNITED STATES PATENTS

| | | | |
|---|---|---|---|
| 1,138,356 | 5/1915 | Conte | 198—30 |
| 1,495,610 | 5/1924 | Paridon | 198—30 |
| 1,828,232 | 10/1931 | Rowe | 198—29 |
| 1,883,078 | 10/1932 | Stretch | 198—30 |
| 1,886,896 | 11/1932 | Nelson | 198—29 X |
| 2,198,594 | 4/1940 | Mundy | 198—29 |
| 2,572,325 | 10/1951 | Ernst | 198—29 |
| 2,633,971 | 4/1953 | Albertoli | 198—30 |
| 2,758,697 | 8/1956 | Schulz | 198—30 |
| 2,928,521 | 3/1960 | Johnson. | |
| 2,990,935 | 7/1961 | Bailey | 198—33 |
| 3,049,216 | 8/1962 | Campbell. | |
| 3,100,562 | 8/1963 | Whelan | 198—33 |

EVON C. BLUNK, *Primary Examiner.*

EDWARD A. SROKA, SAMUEL F. COLEMAN,
*Examiners.*